July 28, 1953  G. A. HATHERELL  2,646,987
SCORING SYSTEM FOR BALL GAMES
Filed Dec. 23, 1946  8 Sheets-Sheet 1
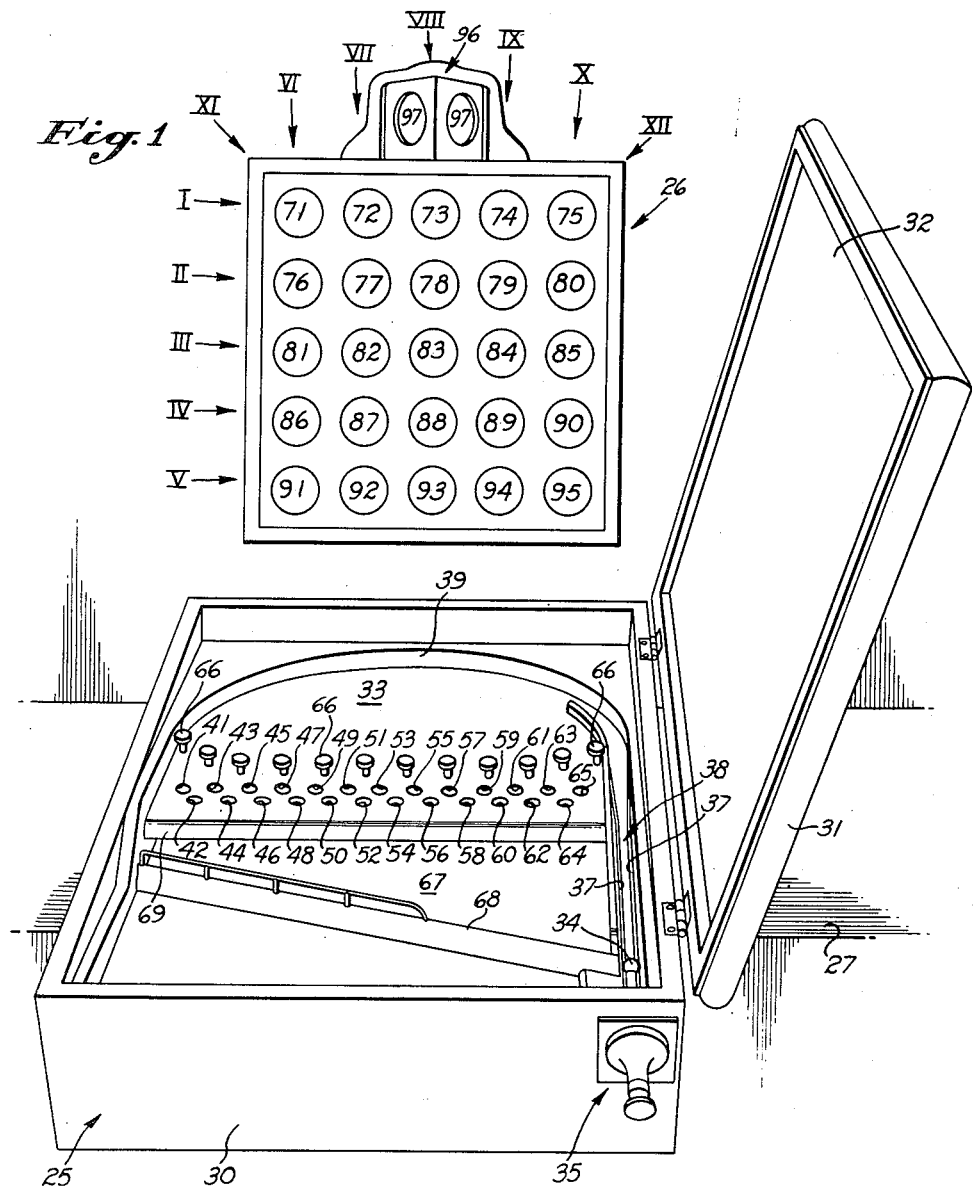
INVENTOR:
GEORGE A. HATHERELL
By His ATTORNEYS
HARRIS, KIECH, FOSTER & HARRIS

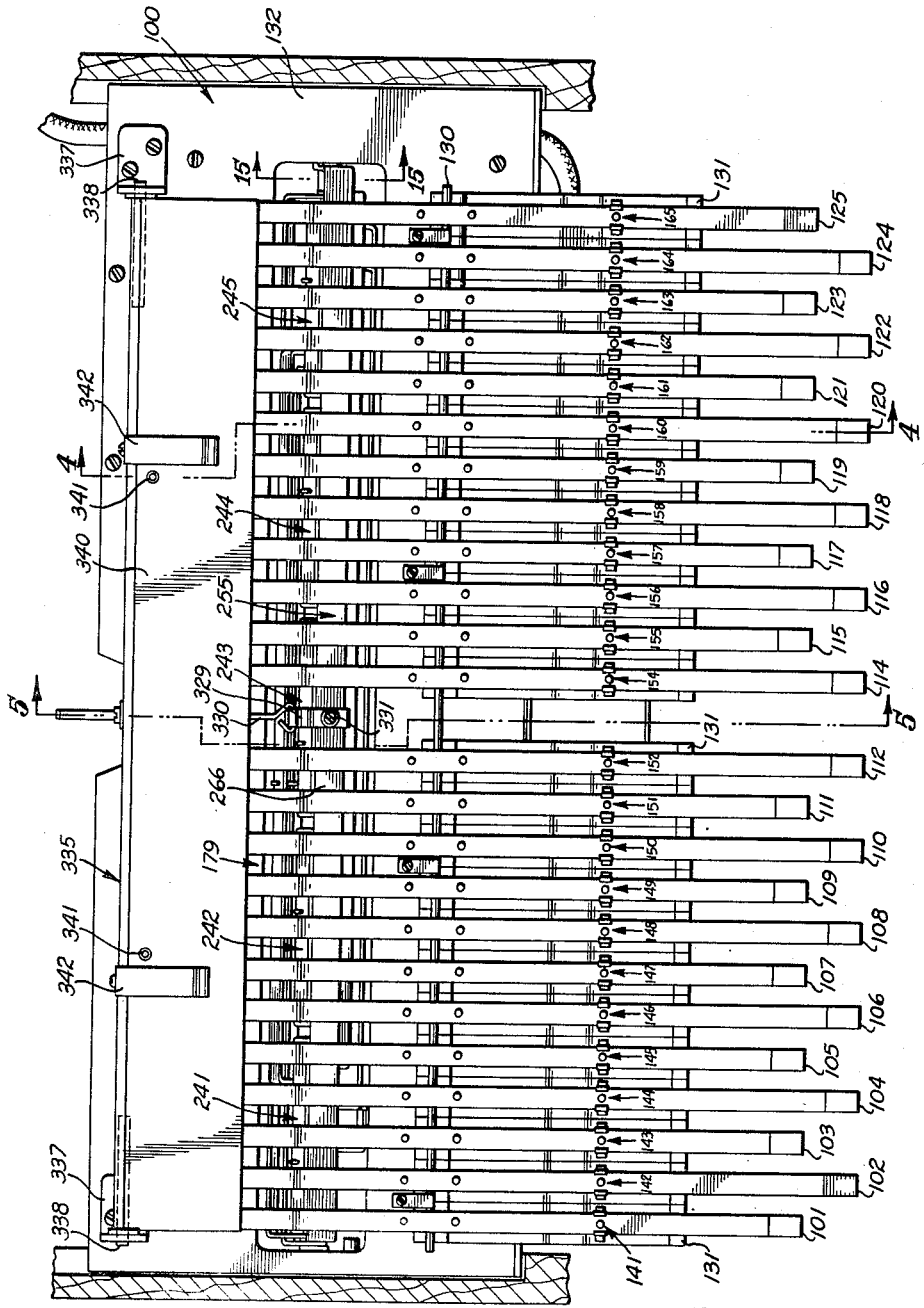

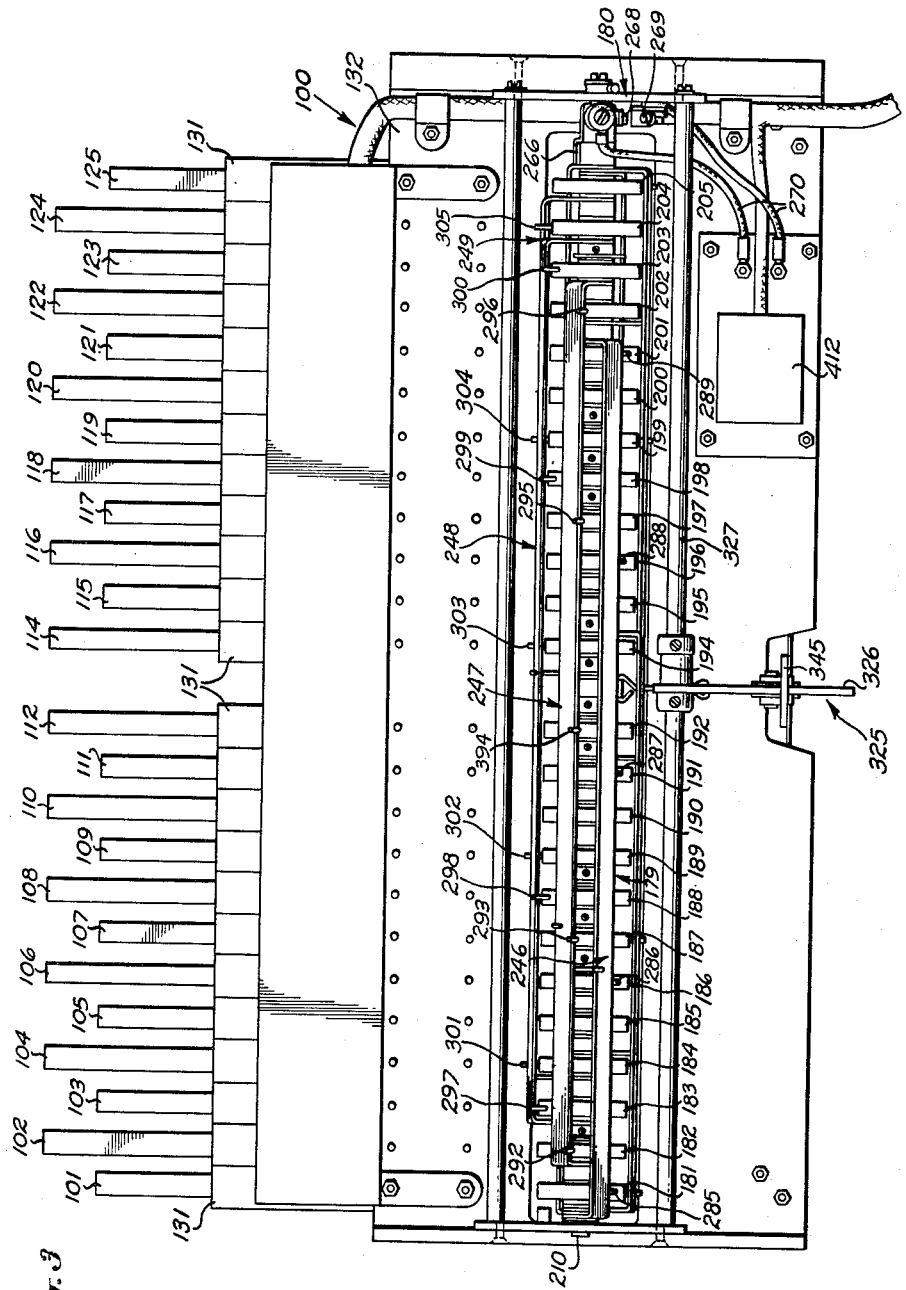

July 28, 1953  G. A. HATHERELL  2,646,987
SCORING SYSTEM FOR BALL GAMES
Filed Dec. 23, 1946  8 Sheets-Sheet 4
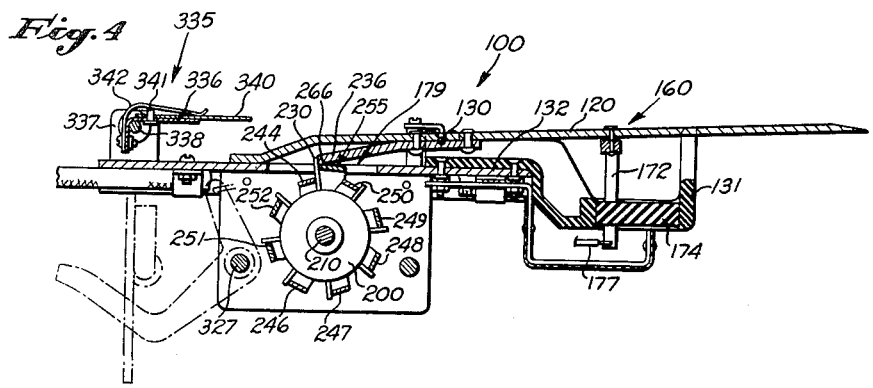
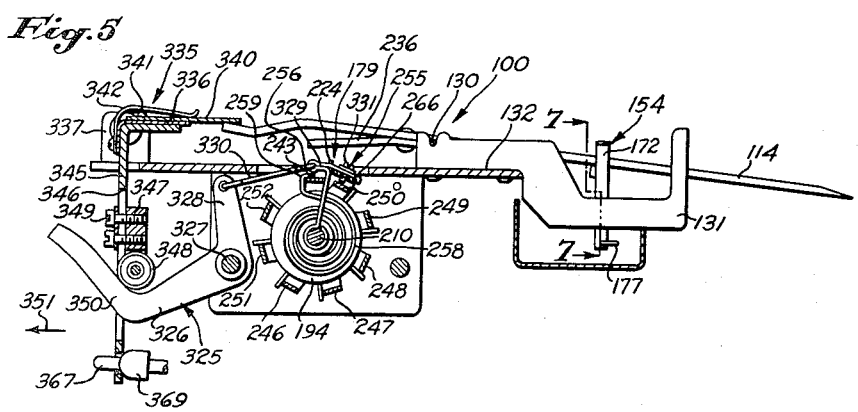
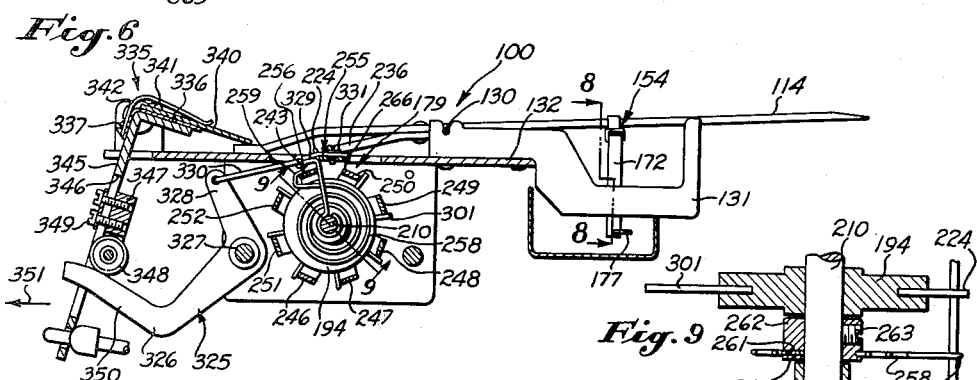
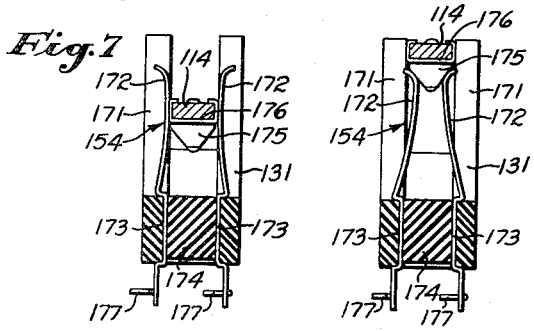
INVENTOR:
GEORGE A. HATHERELL
By His Attorneys
HARRIS, KIECH, FOSTER & HARRIS

July 28, 1953 G. A. HATHERELL 2,646,987
SCORING SYSTEM FOR BALL GAMES
Filed Dec. 23, 1946 8 Sheets-Sheet 5
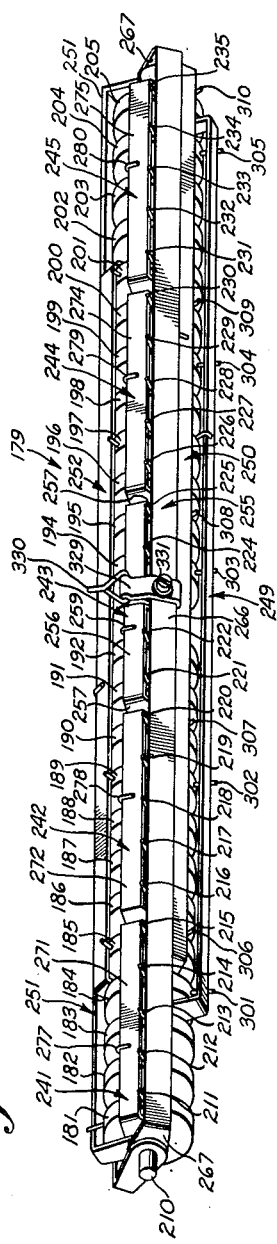
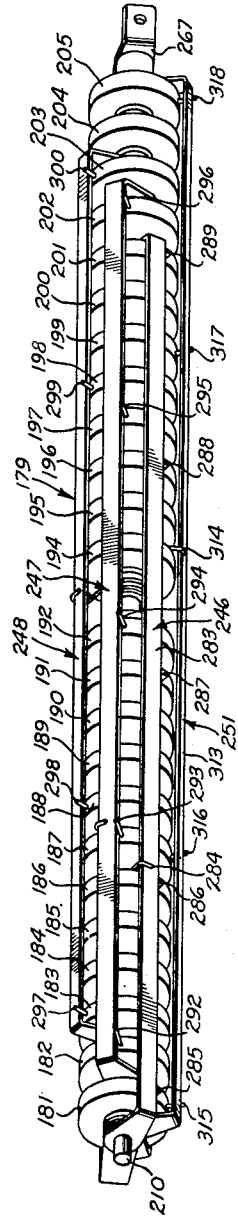
INVENTOR:
GEORGE A. HATHERELL
BY HIS ATTORNEYS
HARRIS, KIECH, FOSTER & HARRIS

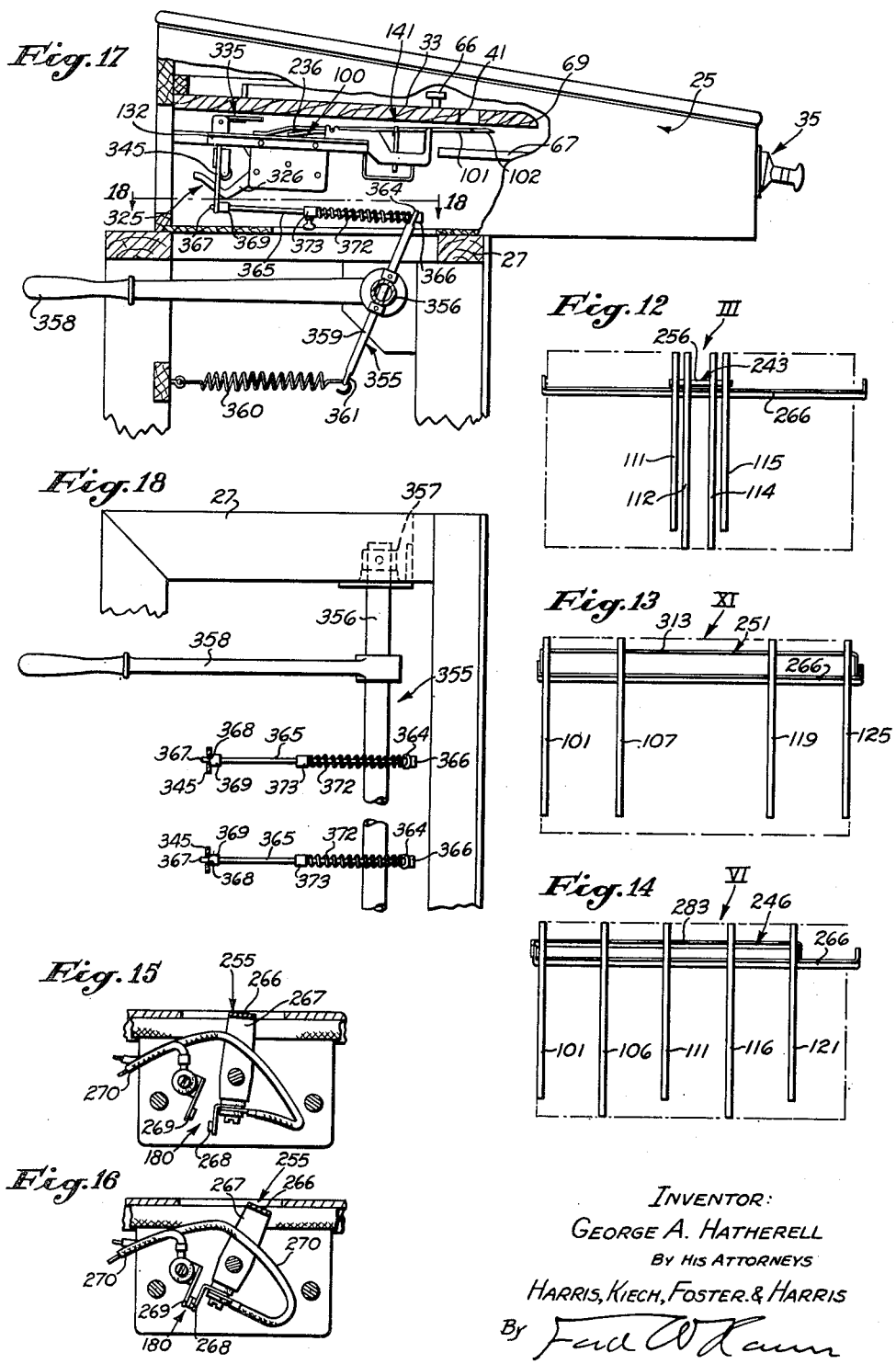

July 28, 1953

G. A. HATHERELL 2,646,987

SCORING SYSTEM FOR BALL GAMES

Filed Dec. 23, 1946

*Inventor:*
GEORGE A. HATHERELL
By His Attorneys
HARRIS, KIECH, FOSTER & HARRIS

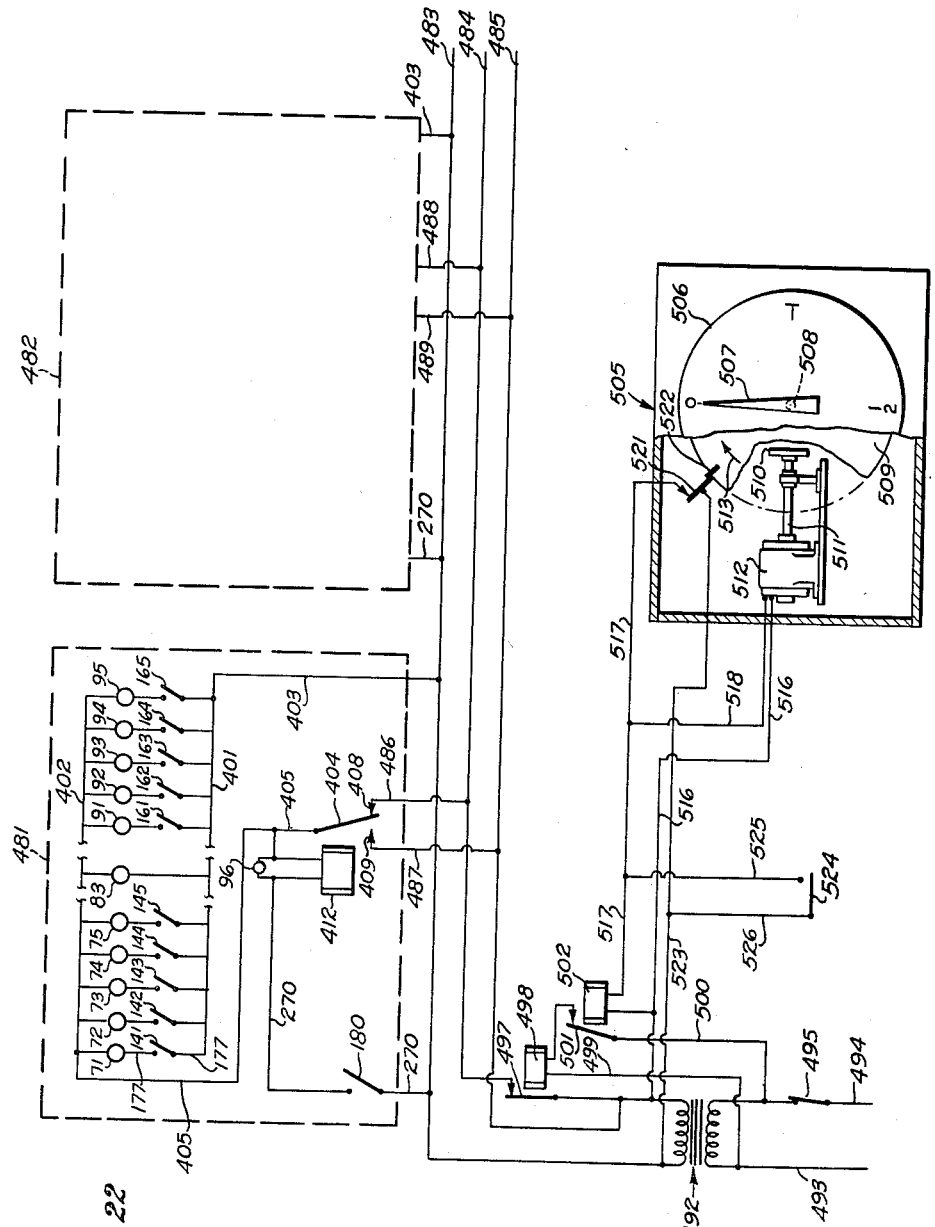

Patented July 28, 1953

2,646,987

UNITED STATES PATENT OFFICE 2,646,987

SCORING SYSTEM FOR BALL GAMES

George A. Hatherell, Roscoe, Calif.

Application December 23, 1946, Serial No. 717,910

3 Claims. (Cl. 273—121)

My invention relates in general to games and, more particularly, to game apparatus including a plurality of individual games or game units with which various winning plays, or, preferably, various winning combinations of scoring plays may be made by individual players using such objects as balls, for example, and including an indicating system associated with each game unit for registering the scoring plays and the winning combinations of scoring plays made therewith.

A primary object of the invention is to provide a game of the character described wherein the individual games or game units are interconnected in such a manner that any game unit whose indicating system does not register a winning combination of scoring plays is rendered inoperative at a predetermined point during the play of the game without rendering inoperative any game unit whose indicating system registers a winning combination.

An important object of my invention is the provision of apparatus wherein all of the individual games whose indicating systems do not register a winning combination are rendered inoperative after a predetermined interval of time has elapsed from the start of the contest without rendering inoperative any of the individual games whose respective indicating systems register winning combinations regardless of whether several winning combinations or no winning combinations have been made.

Another object of the invention is to provide a game in which all of the individual game units whose indicating systems do not register a winning combination of scoring plays are rendered inoperative as soon as a winning combination is made on any one of the game units without rendering inoperative the game unit whose indicating system registers the first winning combination.

Another important object is to provide a game having the characteristics set forth in the foregoing objects which includes, a component thereof, apparatus for varying the score values assigned to the various winning combinations of scoring plays as the game progresses.

Still another object of the invention is to provide a game of the character set forth in the preceding object wherein the apparatus for varying the score value of the winning combinations progressively decreases the value thereof as the game progresses so that the sooner the winning player completes his winning combination of plays, the greater will be the score derived therefrom. Thus, each player is competing against time as well as with the other players, which is an important feature of the invention.

Another object in this connection is to provide apparatus for varying the score value of the winning combinations in a non-uniform manner so that a skillful player may complete his winning combination of scoring plays at a time when the value of his winning combination is high. Thus, each player is not only competing with the other players taking part in the contest, but must also exercise considerable skill so as to complete his winning combination when the value thereof is high rather than at some earlier or later time when its value may be lower.

Still another important object of my invention is to provide individual game units having completely mechanical systems for actuating the indicating systems thereof to register scoring plays, and for actuating apparatus which renders nonwinning game units inoperative either when a winning combination of scoring plays is made on one of the game units, or after a predetermined interval of time has elapsed from the start of play of the game.

More specifically, an object of my invention is to provide a mechanical scoring system which responds to individual scoring plays by energizing corresponding electrical indicators in the indicating system associated therewith, which indexes or classifies the individual scoring plays, and which responds to a scoring play that completes any one of several possible winning combinations of scoring plays by energizing a master electrical indicator to register the fact that a winning combination of scoring plays has been made, and by simultaneously energizing electrical apparatus for controlling the operativeness of the individual game units. Still another object in this connection is to provide a mechanical re-setting system inter-connecting the mechanical scoring systems of the various individual game units whereby all of the mechanical scoring systems may be re-set simultaneously after completion of play by an operator supervising the entire game apparatus.

The foregoing objects of my invention, together with various other objects thereof and various advantages which will be evident hereinafter, may be realized by means of the exemplary embodiments of the invention which are illustrated in the accompanying drawings, and which are described in detail hereinafter. Referring to the drawings:

Fig. 1 is a perspective view illustrating an individual game or game unit, including a score indicating system, which embodies the fundamental principles of my invention;

Fig. 2 is a top plan view of a mechanical scoring system which forms part of the game unit illustrated in Fig. 1;

Fig. 3 is a bottom plan view of the mechanical scoring system illustrated in Fig. 2;

Figs. 4 and 5 are transverse sectional views of the mechanical scoring system which are taken along the broken lines 4—4 and 5—5, respectively, of Fig. 2;

Fig. 6 is a transverse sectional view of the mechanical scoring system which is identical to Fig. 5 except that various components of the scoring system are shown in their inoperative positions in Fig. 6 whereas such components are shown in their operative positions in Fig. 5;

Figs. 7 and 8 are enlarged sectional views which are taken along the lines 7—7 and 8—8, respectively, of Figs. 5 and 6, respectively, and which illustrate another component of the mechanical scoring system in its operative and inoperative positions, respectively;

Fig. 9 is an enlarged sectional view which is taken along the broken line 9—9 of Fig. 6;

Fig. 10 is a perspective view of mechanism forming part of the mechanical scoring system of the game unit for tracing winning combinations of scoring plays by classifying or indexing each scoring play as it is made and by subsequently closing a control or master switch whenever a scoring play which completes a particular winning combination has been made;

Fig. 11 is another perspective view of the winner tracing mechanism shown in Fig. 10, the mechanism being rotated approximately 180° from the position shown in Fig. 10;

Figs. 12, 13 and 14, are semi-diagrammatic views illustrating three of a plurality of possible combinations of actuating devices or actuating members which must be moved to operative positions by and object such as a ball, for example, used in playing the game to make corresponding winning combinations of scoring plays;

Figs. 15 and 16 are fragmentary sectional views which are taken along the broken line 15—15 of Fig. 2, and which illustrate the master switch previously referred to in the description of Fig. 10, the master switch being shown in its inoperative or open position in Fig. 15, and being shown in its operative or closed position in Fig. 16;

Fig. 17 is a side elevational view of a portion of the individual game unit illustrated in Fig. 1, parts thereof being broken away to illustrate the manner in which the mechanical scoring system shown in Fig. 2 is mounted therein. Fig. 17 also illustrates a portion of a mechanical system for simultaneously re-setting the mechanical scoring systems of a plurality of interconnected individual game units so as to restore the components of the various scoring systems to their inoperative positions upon completion of play;

Fig. 18 is a plan view of portions of the mechanical re-setting system inter-connecting the various game units and is taken along the broken line 18—18 of Fig. 17;

Fig. 19 is a partially diagrammatic view illustrating an electric circuit which inter-connects the mechanical scoring system of each game unit with the indicating system thereof, and illustrating electrical circuits which inter-connect a plurality of the individual game units in such a manner that all of the game units are rendered inoperative upon completion of a winning combination of scoring plays except for that unit on which the winning combination is made. Fig. 19 also illustrates apparatus associated with the electrical circuit inter-connecting the individual game units for varying the value of the scores awarded for winning combinations of scoring plays as the game progresses, the score varying apparatus being provided with an indicating member or dial having numerals thereon which are indicative of the varying score values;

Fig. 20 is a sectional view of the apparatus for varying the score values and is taken along the broken line 20—20 of Fig. 19;

Fig. 21 is a plan view of another embodiment of a dial for use with the score varying apparatus illustrated in Fig. 19, the dial illustrated in Fig. 21 having numerals thereon indicating score values which may increase or decrease in a non-uniform manner; and Fig. 22 is a view which is in general similar to Fig. 19, except that it illustrates electrical circuits inter-connecting the various game units which include apparatus for rendering inoperative any game unit on which a winning combination of scoring plays has not been made after a predetermined interval of time has elapsed from the start of play of the game, regardless of whether winning combinations have been made on several or none of the game units.

Referring to Fig. 1 of the drawings, each of the individual game units includes a playing section 25 and an indicating system or panel 26, the playing section being mounted on a table 27 which is common to the playing sections of all of the game units, and the indicating panel being mounted on a wall (not shown) behind the playing section of the corresponding game unit in the particular construction illustrated. It will be understood, however, that the playing section 25 and indicating panel 26 of each game unit may be formed integrally, if desired, and I do not intend to be limited to the particular arrangement thereof illustrated in the drawing.

Considering the general construction of the playing section 25, it preferably includes a housing 30 which encloses various of the electrical and mechanical components of the game unit and which is preferably provided with a hinged cover 31, the cover having a transparent panel 32 through which a player may observe the plays he is making as will be discussed in more detail hereinafter. Disposed within the housing 30 is a forwardly-inclined playing surface or board 33 over which an object such as a ball 34, for example, may be moved by suitable propelling mechanism which is indicated generally at 35, the propelling mechanism being of any suitable construction and not being described in detail herein. After being acted upon by the propelling mechanism 35, the ball 34 is guided to the playing surface 33 by members 37 which form a guide passage 38 therebetween in the conventional manner. If desired, a curved deflecting wall 39 may be mounted on the playing surface 33 to deflect the ball 34 if it is ejected at a high velocity by the propelling mechanism 35 as is well known in the art.

In the particular construction illustrated, the playing surface 33 is provided with a plurality of holes or apertures therein through which the ball 34 may drop in moving over the playing surface to make scoring plays, the apertures being twenty-five in number in the particular construction illustrated and being identified by the numerals 41 to 65, inclusive. However, the exact number of apertures employed is not critical and any desired number may be used. Alternate apertures of the apertures 41 to 65 are preferably staggered with respect to the remaining apertures and, if desired, obstructions such as bumpers 66 may be mounted on the inclined playing surface 33 above the apertures therein to deflect the ball 34 and to reduce the speed thereof so that it will drop through the apertures more readily.

As the ball 34 drops through one of the apertures 41 to 65, it operates a component of a mechanical scoring system so as to energize a corresponding electrical indicator on the indicating panel 26 as will be described in more detail hereinafter. The ball 34 then drops onto a forwardly-inclined surface 67 below the playing surface 33, and rolls downwardly along the surface 67 until it encounters a guide member 68 which returns it to the propelling mechanism 35 for another play. If the ball 34 fails to drop through any one of the apertures 41 to 65 in the playing surface 33, it will roll over the forward or lower edge 69 of the playing surface and drop onto the surface 67 whereupon the guide member 68 will return it to the propelling mechanism 35. The guide passage 38 for the ball 34 is preferably so inclined that the propelling mechanism 35 is at the same level as a portion of the surface 67 thereadjacent so that the guide member 68 will return the ball directly to the propelling mechanism. Alternatively, the propelling mechanism 35 may be located at a higher elevation than the surface 67 and suitable means (not shown) for lifting the ball into the guide passage 38 may be employed as is well known in the art.

The indicating panel 26 includes a plurality of individual indicators 71 to 95, inclusive, which corresponds to the apertures 41 to 65, inclusive, in the playing surface 33, each indicator being actuated in a manner to be described hereinafter to register a scoring play whenever the ball 34 drops through the aperture corresponding thereto. The indicators 71 to 95 preferably comprise electric lamps or light bulbs (not shown in Fig. 1) which are located behind transparent windows or the like in the indicating panel 26. For the convenience of a player using the game unit, corresponding apertures in the playing surface 33 and windows in the indicating panel 26 are preferably identified by identical numerals or other symbols (not shown) so that if the player is attempting to energize a given indicator on the indicating panel, he may readily determine through which of the apertures 41 to 65 the ball 34 must be dropped and may govern his play accordingly.

A master, or win indicator 96 which is adapted to register the fact that a winning combination of scoring plays has been made is preferably mounted on the indicating panel 26, the manner in which the master indicator is actuated to indicate a winning combination being discussed in detail hereinafter. As is preferably the case with the individual indicators 71 to 95 for registering scoring plays, the master indicator 96 preferably comprises an electric light bulb which is located behind windows 97 in the indicating panel. If desired, the windows 97 may be provided with numerals or other symbols thereon to identify the game unit, the various game units in the apparatus being provided with different identifying numerals or symbols.

Before beginning a detailed description of the game unit illustrated in Fig. 1, a general explanation of its operation will be made so that the detail discussion of the unit may be understood more readily. Whenever the player actuates the propelling mechanism 35 of the game unit to propel the ball 34 over the playing surface 33, the ball will roll down the forwardly-inclined playing surface and will either drop through one of the apertures 41 to 65 therein, or will roll over the lower edge 69 thereof and drop onto the surface 67. Whenever the ball 34 drops through one of the apertures 41 to 65 for the first time during a particular contest, a scoring play is made, and the ball, in dropping through the aperture, acts upon a corresponding component of a scoring system or scoring apparatus which energizes the corresponding indicator on the indicating panel 26.

The individual scoring plays made by causing the ball 34 to drop through various of the apertures 41 to 65 are divided into winning groups or combinations of scoring plays, the object of the game being to complete one or more of such winning combinations. In the particular embodiment of my invention disclosed herein, the scoring plays are divided into winning combinations of five individual scoring plays each, such winning combinations being attained whenever any one of the five horizontal, five vertical, or two diagonal rows of indicators on the indicating panel 26 have been energized by dropping the ball 34 through the corresponding apertures in the playing surface 33. Thus, twelve winning combinations of scoring plays may be made by causing the ball 34 to drop through the apertures corresponding to the individual indicators 71, 72, 73, 74, and 75; 76, 77, 78, 79, and 80; 81, 82, 83, 84, and 85; 86, 87, 88, 89, and 90; 91, 92, 93, 94, and 95; 71, 76, 81, 86, and 91; 72, 77, 82, 87, and 92; 73, 78, 83, 88, and 93; 74, 79, 84, 89, and 94; 75, 80, 85, 90, and 95; 71, 77, 83, 89, and 95; and 75, 79, 83, 87, and 91, the winning combinations corresponding to the foregoing groups of indicators being identified by the numerals I to XII, respectively. Other winning combinations of scoring plays may also be employed, or individual winning scoring plays may be employed, and, consequently, I do not desire to be limited to the particular winning combinations indicated above.

It will be apparent that some of the foregoing winning combinations of scoring plays may be attained more readily than others, the more difficult combinations preferably being assigned higher score values than the easier combinations. For example, the winning combinations of scoring plays represented by the horizontal rows of indicators on the indicating panel 26, i. e., winning combinations I to V, may be relatively easier to make than those represented by the vertical or diagonal rows of indicators, i. e., winning combinations VI to X, or XI and XII, since the apertures in the playing surface 33 corresponding to winning combinations I to V are located adjacent each other. Consequently, a skillful player may cause the ball 34 to drop through the apertures in the playing surface 33 corresponding to any one of the various horizontal rows of indicators on the indicating panel 26 fairly easily by applying a substantially constant propelling force to the ball with the propelling mechanism 35 on successive plays so as to "group his shots," causing the ball to drop through the apertures corresponding to winning combinations VI to XII being relatively more difficult since the apertures corresponding to these combinations are spaced apart. In order to provide further variations in the relative ease or difficulty of making the various winning combinations I prefer to provide a construction wherein the indicator 83 at the center of the indicating panel remains energized at all times as will be discussed in more detail hereinafter. In this construction the corresponding aperture in the playing surface 33, i. e., the aperture 53, is not required and is preferably replaced by a bumper such as one of the bumpers 66.

Considering the game unit in more detail, a mechanical scoring system or apparatus 100 is mounted beneath the playing surface 33 in the manner shown in Fig. 17, this scoring system being adapted to energize the various indicators on the indicating panel 26 whenever the ball 34 drops through the corresponding apertures in the playing surface, and being adapted to close a control or master switch upon completion of any one of the foregoing winning combinations of scoring plays so as to energize the master indicator 96 and to actuate electrical apparatus for performing a variety of other functions, all as will be described in detail hereinafter.

The scoring apparatus 100 is illustrated in detail in Figs. 2 to 16, inclusive, and, referring particularly to Fig. 2, includes a plurality of actuating devices or levers 101 to 112 and 114 to 125, both inclusive, which correspond to the apertures 41 to 52 and 54 to 65, respectively, in the playing surface 33, and which also correspond to the indicators 71 to 82 and 84 to 95, respectively, on the indicating panel 26, there being no actuating lever corresponding to the indicator 83 since this indicator is always energized as previously mentioned. As best shown in Figs. 5 and 6, the actuating levers 101 to 112 and 114 to 125 are mounted for rotation about a rod 130 which extends across the scoring apparatus 100 transversely of the levers, and which is carried by a plurality of electrical insulating members each of which is identified by the numeral 131, the number of such insulating members corresponding to the number of levers, which is twenty-four in the particular construction illustrated. The insulating members 131 are suitably secured to a frame structure 132 which forms part of the scoring apparatus 100.

As indicated generally in Fig. 17, the scoring apparatus 100 is mounted in the housing 30 of the game unit and beneath the playing surface 33 thereof in such a position that the forward ends of the actuating levers 101 to 112 and 114 to 125 are located beneath the apertures 41 to 52 and 54 to 65, respectively, in the playing surface 33, so that the ball 34, in dropping througuh one of the apertures, will encounter the corresponding actuating lever and will rotate that lever about the rod 130 from an inoperative position, as shown in Fig. 6, to an operative position, as shown in Fig. 5. Referring particularly to Fig. 2, alternate levers of the actuating levers 101 to 112 and 114 to 125 are shorter than the levers thereintermediate so that the forward ends of the shorter levers are staggered with respect to the forward ends of the longer levers in correspondence with the staggered relationship of alternate apertures of the apertures 41 to 52 and 54 to 65 in the playing surface 33 relative to the apertures thereintermediate.

The actuating levers 101 to 112 and 114 to 125 are adapted to close individual auxiliary switches 141 to 152 and 154 to 165, respectively, whenever the levers are rotated into their opertive positions by the ball 34 in dropping through the corresponding apertures 41 to 52 and 54 to 65, respectively, in the playing surface 33, the switches 141 to 152 and 154 to 165 being electrically connected to the indicators 71 to 82 and 84 to 95, respectively, on the indicating panel 26, as shown schematically in Figs. 19 and 22. Since the indicator 83 is always energized as previously discussed, there is no auxiliary switch corresponding thereto. Whenever the ball 34 drops through one of the apertures 41 to 52 and 54 to 65, the corresponding actuating lever is rotated into its operative position thereby to close the corresponding switch and to energize the corresponding indicator on the indicating panel 26. As will be apparent hereinafter, the switches 141 to 152 and 154 to 165 are adapted to retain the respective actuating levers 101 to 112 and 114 to 125 in their operative positions to maintain the energization of the respective indicators 71 to 82 and 84 to 95 until the actuating levers are re-set in a manner to be described. Thus, whenever a scoring play is made with the ball 34 in the manner described, the corresponding indicator on the indicating panel 26 continues to register that fact until all of the actuating levers are re-set at the end of the contest.

The individual switches 141 to 152 and 154 to 165 are all of identical construction so that only one of them need be considered in detail, the structural details of the switch 154 being shown in Figs. 5 to 8, inclusive. Referring thereto, it will be noted that the switch 154 is mounted on one of the insulating members 131, the latter being bifurcated to provide a pair of arms 171 which receive the switch 154 therebetween. As best shown in Figs. 7 and 8, the switch 154 includes a pair of spaced, resilient arms or prongs 172 having indented portions 173 which fit over the arms 171 of the bifurcated insulating member 131, a block 174 of insulating material being wedged between the indented portion of the prongs to secure the prongs to the member 131.

Secured to the actuating lever 114, which corresponds to the switch 154, is a wedge member 175 of electrical insulating material and a conductor 176 which partially encompasses the actuating lever. When the actuating lever 114 is in its inoperative position, as shown in Figs. 6 and 8, the wedge member 175 of insulating material is disposed between the prongs 172 of the switch 154 so that no current can flow from one to the other. However, whenever the actuating lever 114 is rotated into its operative position by the action of the ball 34 in dropping through the corresponding aperture 54 in the playing surface 33 as previously described, movement of the lever 114 into its operative position causes the conductor 176 carried thereby to engage the resilient prongs 172 of the switch 154 so that current may flow therebetween, the function of the insulating wedge member 175 on the actuating lever being to spread the resilient prongs of the switch an appreciable amount so that their resilience urges them into positive contact with the conductor 176. As shown in Figs. 7 and 8, suitable leads 177 are connected to the prongs 172 of the switch 154, these leads forming part of the circuit inter-connecting the various switches 141 to 152 and 154 to 165 and the corresponding indicators 71 to 82 and 84 to 95 as shown in Figs. 19 and 22.

It will thus be apparent that whenever a scoring play wherein the ball 34 drops through one of the apertures 41 to 52 and 54 to 65 in the playing surface 33 is made, the ball will rotate the corresponding actuating lever from its inoperative position to its operative position to close the corresponding switch so as to energize the corresponding indicator on the indicating panel 26, the electrical circuit in which the indicators 71 to 95 are connected, shown in Figs. 19 and 22, being connected to a suitable source of power in a manner which will be described in more detail hereinafter.

In addition to energizing the respective indicators on the indicating panel 26 when rotated to their operative positions by the ball 34, the actuating levers 101 to 112 and 114 to 125 are adapted to operate a winner tracing mechanism indicated generally by the numeral 179 which is adapted to classify or index each scoring play as it is made, and which is adapted to close a control or master switch 180 whenever any of the winning combinations of scoring plays has been made, the master switch, when closed in this manner, being adapted to close a winner circuit, all as will be described in more detail hereinafter.

As best shown in Figs. 10 and 11, the winner tracing mechanism 179 includes indexing means comprising a plurality of rotatable indexing devices or discs 181 to 192 and 194 to 205 which correspond to the actuating levers 101 to 112 and 114 to 125, respectively, and to the indicators 71 to 82 and 84 to 95, respectively, there being no indexing disc corresponding to the central indicator 83 on the indicating panel 26 since this indicator is always energized during play of the game unit in the particular construction illustrated as previously discussed. As best shown in Fig. 3, the indexing discs 181 to 192 and 194 to 205 are aligned with the corresponding actuating levers 101 to 112 and 114 to 125, respectively, and are rotatably mounted on a common shaft 210 which extends across the scoring apparatus 100 and is suitably secured to the frame structure 132 thereof.

As best shown in Fig. 10, each of the indexing discs 181 to 192 and 194 to 205 includes a retaining pin extending radially therefrom, the retaining pins associated with the indexing discs 181 to 192 and 194 to 205 being identified by the numerals 211 to 222 and 224 to 235, respectively. The actuating levers 101 to 112 and 114 to 125 include retaining members or stops 236 which are riveted or otherwise secured thereto and which are adapted to engage the retaining pins 211 to 222 and 224 to 235, respectively, on the indexing discs 181 to 192 and 194 to 205, respectively, when the actuating levers are in their inoperative positions so as to prevent rotation of the indexing discs in the clockwise direction as viewed in Figs. 4 and 10. However, whenever the actuating levers 101 to 112 and 114 to 125 are rotated into their operative positions by the ball 34 in the manner described, the stops 236 connected thereto disengage the retaining pins 211 to 222 and 224 to 235, respectively, on the indexing discs, as shown in Fig. 5, to release the corresponding indexing discs. Whenever all of the indexing discs corresponding to one of the winning combinations I to XII of scoring plays have been disengaged and released by the corresponding stops 236 upon rotation of the corresponding actuating levers into their operative positions, the indexing discs corresponding to that winning combination are rotated from inoperative positions as shown in Fig. 4, to operative positions, as shown in Fig. 5, in a manner to be described in the following paragraphs so as to close the master switch 180.

The winner tracing mechanism 179 includes means for selectively rotating groups or combinations of the indexing discs 181 to 192 and 194 to 205 corresponding to the various winning combinations I to XII of scoring plays from their inoperative positions to their operative positions whenever the indexing discs in a particular combination have been released by the corresponding stops 236 upon rotation of the corresponding actuating levers to their operative positions by the ball 34. As best shown in Figs. 10 and 11, the winner tracing mechanism 179 includes individual selecting devices or selectors 241 to 252, inclusive, for rotating to their operative positions the combinations of indexing discs corresponding to the winning combinations I to XII, respectively, upon completion of such winning combinations. Thus, the selector 241 is adapted to rotate indexing discs 181 to 185, inclusive, to their operative positions upon completion of winning combination I; the selector 242 is adapted to rotate the indexing discs 186 to 190, inclusive, to their operative positions upon completion of winning combination II; the selector 243 is adapted to rotate the indexing discs 191, 192, 194, and 195, to their operative positions upon completion of winning combination III; the selector 244 is adapted to rotate the indexing discs 196 to 200, inclusive, to their operative positions upon completion of winning combination IV; the selector 245 is adapted to rotate the indexing discs 201 to 205, inclusive, to their operative positions upon completion of winning combination V; the selector 246 is adapted to rotate the indexing discs 181, 186, 191, 196, and 201 to their operative positions upon completion of winning combination VI; the selector 247 is adapted to rotate the indexing discs 182, 187, 192, 197, and 202 to their operative positions upon completion of winning combination VII; the selector 248 is adapted to rotate the indexing discs 183, 188, 198, and 203 to their operative positions upon completion of winning combination VIII; the selector 249 is adapted to rotate the indexing discs 184, 189, 194, 199, and 204 to their operative positions upon completion of winning combination IX; the selector 250 is adapted to rotate the indexing discs 185, 190, 195, 200, and 205 to their operative positions upon completion of winning combination X; the selector 251 is adapted to rotate the indexing discs 181, 187, 199, and 205 to their operative positions upon completion of winning combination XI; and the selector 252 is adapted to rotate the indexing discs 185, 189, 197, and 201 to their operative positions upon completion of winning combination XII, all in a manner to be described in the following paragraphs. As each of the selectors 241 to 252 rotates the corresponding indexing discs from their inoperative positions to their operative positions upon completion of the corresponding winning combinations of scoring plays, the retaining pins (211, etc.) on the discs being rotated actuate control means 255 for closing the master switch 180 as will be described in more detail hereinafter.

The selectors 241 to 245 are all of substantially identical construction so that only one of these selectors need be described in detail, the selector 243, which is adapted to rotate the indexing discs 191, 192, 194, and 195 into their operative positions whenever the actuating levers 111, 112, 114, and 115 shown diagrammatically in Fig. 12 have been rotated into their operative positions by the ball 34 to complete winning combination III, being illustrated in detail in Figs. 5, 6, 9, and 10. Referring particularly to Fig. 10, the selector 243 includes a generally U-shaped selector bar 256 which spans the indexing discs 191, 192, 194, and 195 corresponding thereto, and which is provided with a pair of arms 257 that are pivotally connected to the shaft 210 for the indexing discs in a manner not specifically shown in the drawings so that the selector bar 256 is rotatable about the shaft. As viewed in Figs. 5 and 6, the selector bar 256 is biased for rotation in the clockwise direction by a spiral spring 258 the outer end 259 of which is hooked over the selector bar, as best shown in Fig. 9. The inner end 260 of the spring 258 is disposed in a hole 261 in member 262 which is secured to the shaft 210 by a set screw 263, or the like, to anchor the spring with respect to the shaft 210 so that it will urge the selector bar 256 in the clockwise direction as viewed in Figs. 5 and 6.

As best shown in Fig. 10, the selector bar 256 engages the retaining pins 221, 222, 224, and 225 on the indexing discs 191, 192, 194, and 195, respectively, so that rotation of the selector bar 256 by the spring 258 is normally prevented by the aforesaid retaining pins until they are released by rotation of the actuating levers 111, 112, 114, and 115, respectively, into their operative positions by the ball 34 in the manner previously described to complete winning combination III. However, upon release of the retaining pins 221, 222, 224, and 225, the spiral spring 258 is free to rotate the selector bar 256 in the clockwise direction, as viewed from the left in Fig. 10, whereupon the selector bar, acting upon these retaining pins, rotates the indexing discs 191, 192, 194, and 195 corresponding thereto into their operative positions.

As the indexing discs 191, 192, 194, and 195 are rotated into their operative positions in this manner by the selector 243, the retaining pins 221, 222, 224, and 225 corresponding thereto actuate the control means 255 for closing the master switch 180. As best shown in Fig. 10, the control means 255 includes a generally U-shaped control bar or master bar 266 having arms 267 which are pivotally connected to the shaft 210 so that the master bar is rotatable about the shaft. As best shown in Figs. 15 and 16, one of the arms 267 of the master bar 266 carries a contact 268 which forms part of the master switch 180 and which is adapted to engage a stationary contact 269 forming the remainder of the master switch upon rotation of the master bar into its operative position by the selector 243 in the manner described. Electrical leads 270 are connected to the contacts 268 and 269 forming the master switch 180, and form part of the winner circuit for the game unit as illustrated schematically in Figs. 19 and 22. Although I have shown the master switch 180 as being comprised of the movable contact 268 and stationary contact 269, it will be understood that switches of other types may be employed if desired, as, for example, a mercury switch (not shown) carried by the master bar 266.

As previously mentioned, the selectors 241, 242, 244, and 245 are substantially identical to the selector 243 just described, and need not be described in detail. As best shown in Fig. 10, the selectors 241, 242, 244, and 245, respectively, include selector bars 271, 272, 274, and 275 which are biased for rotation in the clockwise direction, as viewed from the left in Fig. 10, by springs which are similar to the spiral spring 258 previously described, the outer ends of the springs associated with the selector bars 271, 272, 274, and 275 being visible in Fig. 10 and being identified by the numerals 277, 278, 279, and 280, respectively. The operation of the selectors 241, 242, 244, and 245 is substantially identical to that of the selector 243 which was described previously, the only difference in operation being that the selector 243 is required to rotate four indexing discs whereas the selectors 241, 242, 244, and 245 are each required to rotate five indexing discs. Thus, the selectors 241 to 245 are adapted to rotate the indexing discs associated therewith into their operative positions whenever the proper indexing discs have been released by the corresponding actuating levers upon completion of winning combinations I to V, respectively, thereby rotating the master bar 266 into its operative position to close the master switch 180 in the manner described.

The remaining selectors i. e., the selectors 246 to 252 corresponding to winning combinations VI to XII, respectively, are of similar construction and operate in a similar manner. One of the principal differences between the selectors 246 to 252 and the selectors 241 to 245 described previously is that the selector bars for the selectors 246 to 252 are considerably longer than the selector bars for the selectors 241 to 245 in view of the fact that the indexing discs associated with the various selectors 246 to 252 are separated by other indexing discs and are not located adjacent each other as is the case with the indexing discs corresponding to the selectors 241 to 245. Since the selectors 246 to 252 are similar to those described previously, only the selectors 246 and 251 will be described in detail in order to avoid unnecessary duplication, the selector 246 corresponding to winning combination VI, which is represented by the first vertical row of indicators on the indicating panel 26 in Fig. 1, and the selector 251 corresponding to winning combination XI which is represented by one of the diagonal rows of indicators on the indicating panel.

As shown schematically in Fig. 14 and in detail in Fig. 11, the selector 246 includes a selector bar 283 which is similar to the selector bars previously described and which is pivotally connected to the shaft 210 in a similar manner, the selector bar 283 spanning the indexing discs 181 and 201 and all of the indexing discs therebetween. The selector bar 283 is biased for rotation in the clockwise direction, as viewed from the left in Fig. 11, by a spiral spring which is similar to those previously described and which is anchored to the shaft 210 in a similar manner, the outer end of the spring associated with the selector bar 283 being visible in Fig. 11 and being identified by the numeral 284. The indexing discs associated with the selector 246, i. e., the discs 181, 186, 191, 196 and 201, are provided with retaining pins 285, 286, 287, 288, and 289, respectively, which engage the selector bar 283, as best shown in Fig. 11, and prevent rotation thereof to its operative position until the indexing discs 181, 186, 191, 196, and 201 have all been released upon rotation of the corresponding actuating levers 101, 106, 111, 116, and 121 into their operative positions by the ball 34 in the manner previously described to complete winning combination VI. Upon release of the indexing discs 181, 186, 191, 196, and 201, these discs are rotated by the corresponding selector 246 which is in engagement with the respective retaining pins 285 to 289 thereon. Thus, as the indexing discs 181, 186, 191, 196, and 201 are rotated into their operative positions, the previously mentioned retaining pins 211, 216, 221, 226, and 231 thereon rotate the master bar 266 into its operative position to close the master switch 180 in the manner previously described. The selectors 247 to 250 are similar to the selector 246 and operate in a similar manner to rotate the master bar 266 into its operative position upon completion of winning combinations VII to X, respectively, the indexing discs associated with the selectors 247 to 250 being provided with retaining pins thereon which are adapted to prevent operation of the selectors 247 to 250 until the proper combinations of indexing discs associated therewith have been released, and which are similar to the retaining pins 285 to 289 on the indexing discs 181, 186, 191, 196, and 201 associated with the selector 246 which was described previously. Referring to Figs. 10 and 11, the retaining pins on the indexing discs 182, 187, 192, 197, and 202 associated with the selector 247 are identified by the numerals 292 to 296, respectively; the retaining pins on the indexing discs 183, 188, 193, 198, and 203 associated with the selector 248 are identified by the numerals 297 to 300, respectively; the retaining pins on the indexing discs 184, 189, 194, 199, and 204 associated with the selector 249 are identified by the numerals 301 to 305, respectively; and the retaining pins on the indexing discs 185, 190, 195, 200, and 205 associated with the selector 250 are identified by the numerals 306 to 310, respectively. The operation of the foregoing retaining pins in preventing operation of the corresponding selectors 247 to 250 until the indexing discs corresponding thereto have been released upon completion of winning combinations VII to X, respectively, is similar to the operation of the retaining pins 285 to 289 in preventing operation of the selector 246 until completion of winning combination VI, and will not be described in detail.

The selector 251 corresponding to winning combination XI, represented by one of the diagonal rows of indicators on indicating panel 26 in Fig. 1, is illustrated schematically in Fig. 13 and in detail in Fig. 11. As best shown in Fig. 11, the selector 251 includes a generally U-shaped selector bar 313 which is pivotally mounted on the shaft 210, and which spans the indexing discs 181 and 205 and all of the indexing discs therebetween. The selector bar 313 is biased for rotation in the clockwise direction, as viewed from the left in Fig. 11, by a spiral spring which is similar to the springs described previously and the outer end of which is visible in Fig. 11 and is identified by the numeral 314. The indexing discs associated with the selector 251, i. e., the discs 181, 187, 199, and 205, are provided with retaining pins 315 to 318, respectively, thereon which engage the selector bar 313 and prevent operation of the selector 251 until the indexing discs associated therewith have all been released upon completion of winning combination XI. Upon release of indexing discs 181, 187, 199, and 205, the selector bar 313 of the selector 251 acts upon the retaining pins 315 to 318 to rotate the indexing discs 181, 187, 199, and 205 into their operative positions, whereupon the previously mentioned retaining pins 211, 217, 229, and 235 thereon act on the master bar 266 to rotate it into its operative position and close the master switch 180 in the manner previously described. The construction and operation of the selector 252, corresponding to winning combination XII, are similar to those of the selector 251 and will not be described in detail.

It will thus be apparent that whenever one of the winning combinations of scoring plays has been completed by causing the ball 34 to drop through the corresponding apertures in the playing surface 33, the ball will rotate the corresponding actuating levers into their operative positions to close the auxiliary switches corresponding thereto and to release the corresponding indexing discs. The selector corresponding to the winning combination of scoring plays will then rotate the corresponding released indexing discs into their operative positions and will simultaneously actuate the control means 255 for closing the master switch 180. The master switch then energizes apparatus for controlling the operativeness of the various game units of which the entire game is comprised, and energizes apparatus for performing other functions which will be described in more detail hereinafter. However, before describing the apparatus energized by closure of the master switch 180, I prefer to consider the manner in which the various components of the mechanical scoring apparatus 100 are restored to their inoperative positions from their operative positions at the end of the play of the game.

As best shown in Figs. 5 and 6, each individual game unit includes a re-setting apparatus or re-setting system, indicated generally by the numeral 325, which is preferably of a mechanical nature and which is adapted to restore all of the movable components of the mechanical scoring system 100 to their inoperative positions simultaneously at the end of the contest. The re-setting apparatus 325 includes a bell crank 326 which is rotatively mounted on a shaft 327, the shaft being suitably secured to the frame structure 132. One arm 328 of the bell crank 326 is pivotally connected to a member 329 by a link 330, the member 329 being rotatably mounted on the shaft 210 for the indexing discs and being connected to the master bar 266 of the control means 255 by a screw 331, or the like.

It will be apparent that if the bell crank 326 is rotated in the counterclockwise direction, as viewed in Figs. 5 and 6, the bell crank, acting through the link 330 and member 329, will rotate the master bar 266 in the counterclockwise direction also. Since the retaining pins 211 to 222 and 224 to 235 on the indexing discs 181 to 192 and 194 to 205, respectively, are in engagement with the master bar 266, such counterclockwise rotation of the master bar, as viewed in Figs. 5 and 6, will simultaneously restore all of the indexing discs to their inoperative positions.

The re-setting apparatus 325 also includes means indicated generally by the numeral 335 for simultaneously restoring all of the actuating levers 101 to 112 and 114 to 125 to their inoperative positions so that the stops 236 carried thereby engage the corresponding retaining pins on the indexing discs 181 to 192 and 194 to 205 so as to retain all of the indexing discs in their inoperative positions. It will be noted that when the indexing discs and actuating levers are restored to their inoperative positions in the manner described, the master switch 180 will be opened since it is actuated by the master bar 266, and the auxiliary switches 141 to 152 and 154 to 165 will also be opened since they are actuated by the levers 101 to 112 and 114 to 125, respectively.

As best shown in Figs. 2 and 4, the means 335 for restoring the actuating levers 101 to 112 and 114 to 125 to their inoperative positions includes an angle section member 336 which is pivotally connected to projections 337 on the frame structure 132 of the scoring apparatus 100 by stub shafts 338. A restoring member or plate 340 spans the rearward ends of all of the actuating levers 101 to 112 and 114 to 125 and is loosely connected to one arm of the member 336 by means of pins 341, as best shown in Fig. 4, the restoring plate being resiliently held in engagement with the member 336 by spring clips 342.

As best shown in Figs. 5 and 6, a re-setting member 345 is secured to the angle member 336 and is provided with a slot 346 therein, a member 347 having a roller 348 mounted thereon being adjustably connected to the re-setting member 345 by screws 349 which extend through the slot 346 therein. The roller 348 engages an arm 350 of the bell crank 326 and as adapted to rotate the bell crank in the counterclockwise direction, as viewed in Figs. 5 and 6, whenever the re-setting number is moved in the direction of the arrow 351, i. e., to the left as viewed in Figs. 5 and 6, to rotate the angle member 336 in the clockwise direction as viewed in these figures. Such rotation of the angle member 336 causes the restoring plate 340 to engage the rearward ends of the actuating levers 101 to 112 and 114 to 125 to rotate the actuating levers from their operative positions, as shown in Fig. 5, to their inoperative positions as shown in Fig. 6.

Movement of the re-setting member 345 in the direction of the arrow 351 thus causes the plate 340 to restore the actuating levers 101 to 112 and 114 to 125 to their inoperative positions, and simultaneously causes the roller 348 to rotate the bell crank 326 so as to restore the control means 255, the indexing discs 181 to 192 and 194 to 205, and the selectors 241 to 252 to their respective inoperative positions. Restoring the control means 255 to its inoperative position causes the master switch 180 to open and, similarly, restoring the actuating levers 101 to 112 and 114 to 125 to their inoperative positions causes the auxiliary switches 141 to 152 and 154 to 165 to open. Thus, such movement of the re-setting member 345 in the direction indicated by the arrow 351 simultaneously moves all of the components of the scoring apparatus 100 from their respective operative positions, as shown in Fig. 5, to their respective inoperative positions, as shown in Fig. 6, to re-set the entire scoring apparatus.

As previously mentioned, I prefer to provide mechanism for simultaneously re-setting the scoring systems 100 of all of the individual game units of which the game apparatus is comprised, such mechanism being indicated generally by the numeral 355 in Figs. 17 and 18. The re-setting mechanism 355 includes a shaft 356 which extends the length of the table 27 on which the individual game units are mounted and which is journaled in bearings 357 that are suitably secured to the table structure. A re-setting handle or lever 358, actuable by the operator supervising the game, is secured to the shaft 356 at any readily accessible point, preferably near one end of the table 27. A plurality of re-setting arms 359, corresponding to the various individual game units, extend through the shaft 356 as best shown in Fig. 17, the entire re-setting mechanism 355 being spring loaded by springs 360 which are connected to the structure of the table 27 and to one end 361 of each of the re-setting arms. The opposite end 364 of each re-setting arm 359 is provided with an opening or eye through which extends a rod 365, one end of each rod 365 having a head 366 thereon which is engageable with the end 364 of the corresponding re-setting arm 359. The opposite end 367 of each rod extends through an opening 368 in the re-setting member 345 of the corresponding game unit, each rod 365 having a collar 369 thereon adjacent the end 367 thereof which communicates movement of the rod to the left, as viewed in Fig. 17, to the corresponding re-setting member 345. A spring 372 encircles each of the rods 365 and is retained in engagement with the end 364 of the corresponding re-setting arm 359 by an adjustable collar 373, the spring 372 being adapted to communicate movement of the re-setting arms to the rods 365.

Considering the operation of the re-setting mechanism 355, it will be apparent that moving the re-setting lever 358 downwardly, as viewed in Fig. 17, will result in counterclockwise rotation of the shaft 356 and re-setting arms 359 in opposition to the action of the springs 360. Such rotation of the re-setting arms 359 is communicated to the corresponding rods 365 through the springs 372 to move the rods to the left, as viewed in Fig. 17, thereby actuating the re-setting members 345 of the various individual game units so as to re-set the various components of the mechanical scoring systems 100 associated therewith in the manner previously described, the springs 360 serving to return the re-setting mechanism 355 to the inoperative position shown in Fig. 17 after the scoring systems of the various individual game units have been re-set.

It will thus be apparent that upon completion of a contest involving a plurality of my individual game units, the mechanical scoring systems 100 of all of the game units may be re-set simultaneously by an operator supervising the contest through the use of the re-setting mechanism 355 by the simple expedient of pushing downwardly on the re-setting lever 358, as viewed in Fig. 17. Consequently, upon completion of one game or contest, the operator supervising the contest may re-set the entire game apparatus quickly and easily in preparation for the next contest, which is an important feature of the invention.

My disclosure has thus far been primarily concerned with the mechanical scoring system 100 of each game unit and the manner in which the scoring system responds to individual scoring plays by energizing the corresponding indicators on the indicating panel 26 associated therewith, and by closing the master switch 180 associated therewith upon completion of a winning combination of scoring plays. As previously mentioned, the individual game units are electrically interconnected so that the completion of a winning combination of scoring plays on any one unit may influence the remaining game units by rendering them inoperative as soon as the winning combination of scoring plays is made. Such an inter-connection of the individual game units is illustrated in Fig. 19 and will now be considered in detail.

For convenience in describing the electrical inter-connection between the various game units, I have shown only two individual game units in Fig. 19, these game units being indicated schematically by the boxes 381 and 382. However, any desired number of game units may be employed, depending upon the number of players to be accommodated. I have found, for example, that a game apparatus comprising fifteen of my individual game units will provide a satisfactory installation in amusement centers, although the number of game units employed may be increased or decreased as desired.

Referring to Fig. 19, the electrical system inter-connecting the game units 381 and 382 preferably comprises four main conductors 383, 384, 385, and 386, the main conductors 383 and 384 being connected to the secondary winding of a transformer 387. The primary winding of the transformer 387 is connected to a suitable current source (not shown) by conductors 388 and 389, the conductor 389 having a main switch 390 in series therewith which is normally closed, i. e., which is closed when the game is in operation. The conductor 384 is connected to the transformer 387 through a switch 393 which is held closed by a relay 394 during play of the game prior to completion of a winning combination of scoring plays on one of the game units 381, etc., the relay 394 being connected to the conductors 388 and 389 by conductors 395 and 396, respectively. The conductor 396 connects the relay 394 to the conductor 389 through a switch 397 which is normally held closed by a spring (not shown), as is well known in the art, and which is controlled by a relay 398 in the conductor 385, the relay 398 being de-energized prior to completion of the first winning combination of scoring plays and, when energized, being adapted to open the switch 397 as will be discussed in detail hereinafter. The main conductor 385 is connected to the main conductor 386 at one side of the relay 398, and the main conductors 385 and 386 are both connected to the main conductor 384 at a point between the transformer 387 and the switch 393.

The indicators 71 to 82 and 84 to 95 of the game unit 381 are connected across conductors 401 and 402 through the auxiliary switches 141 to 152 and 154 to 165, respectively, only the indicators 71 to 75, 83 and 91 to 95 and the switches associated therewith being shown in Fig. 19 for convenience. As previously discussed, there is no switch in series with the indicator 83, this indicator being connected directly across the conductors 401 and 402. The conductor 401 is connected to the main conductor 383 by a conductor 403 and the conductor 402 is connected to a switch 404 by a conductor 405. The switch 404 is movable between contacts 408 and 409 which are connected to the main conductors 384 and 386, respectively, by conductors 410 and 411, respectively, the switch 404 normally engaging the contact 408, and being movable into engagement with the contact 409 by a relay 412 when the relay is energized upon completion of a winning combination on the unit 381 as will be described hereinafter. The relay 412 also controls another switch 413 which is open when the relay is de-energized, and which is movable into engagement with a contact 414 when the relay is energized, the contact 414 being connected to the main conductor 385 by a conductor 415. The relay 412 is connected across the conductor 405 and the conductor 270, the latter being connected to the master switch 180 as previously discussed. The master switch 180, the win indicator 96 which is connected in parallel with the relay 412, and the relay 412 comprise the previously mentioned winner circuit of the game unit 381.

The description of the electrical circuits inter-connecting the game units 381 and 382 has thus far been limited to a description of the manner in which the various electrical components of the game unit 381 are connected to the main conductors 383 to 386. The electrical components of the game unit 382 and any additional game units are identical to those of the game unit 381 and are connected to the main conductors 383 to 386 in an identical manner so that they will not be discussed in detail.

Considering the operation of the electrical system inter-connecting the game units 381, etc., as thus far described, the various electrical components of the game units and the electrical components of the inter-connecting system will be in the positions shown in Fig. 19 at the beginning of play. For convenience in describing the operation of the electrical system inter-connecting the game units 381, etc., it will be assumed that the winning combination of scoring plays is to be made on the game unit 381, although it will be understood that the operation of the inter-connecting system will be the same regardless of which game unit is the winner.

As previously discussed, whenever a scoring play is made by causing the ball 34 to drop through one of the apertures in the playing surface 33 for the first time during the game, the ball will rotate the corresponding actuating lever into its operative position to close the corresponding auxiliary switch, thereby energizing the corresponding indicator on the indicating panel 26. Upon completion of a winning combination of scoring plays, the corresponding selector (241, etc.) will actuate the control means 255 for closing the master switch 180, thereby closing the winner circuit in which the master indicator 96 and the relay 412 are connected. Completion of this winner circuit by closing the master switch 180 causes the master indicator 96 to become energized so as to indicate that a winning combination of scoring plays has been made, and causes the relay 412 to become energized so as to move the switches 404 and 413 into engagement with the contacts 409 and 414, respectively, thereby transferring the game unit 381 from the inter-connecting circuit comprising the main conductors 383 and 384 to the inter-connecting circuit comprising the main conductors 383, 385, and 386. Since it is assumed that the first winning combination of scoring plays is made on the game unit 381, no winning combination will have been made on the game unit 382 and this unit, together with any other game units employed, remains connected to the inter-connecting circuit comprising the main conductors 383 and 384.

Energizing the relay 412 of the winning game unit in the manner described upon completion of a winning combination of scoring plays permits current to flow in the main conductors 385 and 386 by connecting these conductors to the main conductor 383 through the switches 404 and 413, thereby energizing the relay 398 to open the switch 397. Opening the switch 397 causes the relay 394 to become de-energized and thereby permits the switch 393 to open, thus opening the inter-connecting circuit comprising the main conductors 383 and 384. Since a winning combination of scoring plays has not been made on the game unit 382, this unit is still connected to the inter-connecting circuit comprising the main conductors 383 and 384 and is, therefore, rendered inoperative.

It will thus be apparent that when a winning combination of scoring plays is made on any one of the game units, the relay 412 of the winning game unit will become energized by closure of the master switch 180 thereof to transfer the winning unit from the interconnecting circuit comprising the main conductors 383 and 384 to the inter-connecting circuit comprising the main conductors 383, 385, and 386, the game units on which winning combinations of scoring plays have not been made remaining connected to the inter-connecting circuit comprising the main conductors 383 and 384. Since transferring the winning game unit to the interconnecting circuit comprising the conductors 383, 385, and 386 results in opening of the inter-connecting circuit comprising the conductors 383 and 384 in the manner described, the non-winning game units, being connected to this open inter-connecting circuit, are rendered inoperative. Thus, with the electrical inter-connecting system illustrated in Fig. 19, whenever a winning combination of scoring plays is made on any one of the game units, the winning game unit remains operative while the non-winning units are rendered inoperative. It will be apparent that whenever the game units 381, etc., are re-set prior to beginning another game, the various components of the electrical inter-connecting system will resume the positions shown in Fig. 19 automatically.

In accordance with the objects of my invention, I prefer to provide means 425 associated with the electrical system inter-connecting the game units 381, 382, etc., for varying the score values of the winning combinations of scoring plays as the game progresses in order to add to the interest in the game.

As shown in Figs. 19 and 20, the score varying means 425 includes a disc or dial 426 which is rotatable relative to a pointer 427, and which is provided with consecutive numerals thereon (ranging from 1 to 12 in the particular construction illustrated) representing variable score values for the winning combinations, the dial being secured to a shaft 428 which extends into a housing 429 and wihch is journaled in suitable bearings 430 carried by the housing. The dial 426 is driven in the direction of the arrow 432 by an electric motor 433, the shaft 434 of the motor having a drive disc 435 thereon which is adapted to frictionally engage a disc 436 on the dial shaft 428 so that rotation of the motor shaft is communicated to the dial. The motor 433 is carried by a base 439 which is slidably mounted on tracks 440 so that the drive disc 435 may be moved toward or away from the dial shaft 428 to vary the speed of rotation of the dial in an obvious manner, the motor base being movable along the tracks therefor by a screw 441 which is threadedly inserted in a fitting 442 carried by the housing 429. The motor 433 is pivotally mounted on the base 439 by means of a single bolt or pin 445 so that it is rotatable about an axis normal to the motor shaft 434 to permit movement of the drive disc 435 into and out of engagement with the disc 436, such rotation of the motor being effected by a solenoid 446 that is pivotally connected to a bearing 447 in which the motor shaft 434 is journaled. The drive disc 435 is normally held in frictional engagement with the disc 436 on the dial shaft 428 by a suitable spring (not shown) incorporated in the solenoid 446, and is disengaged from the disc 436 by the solenoid whenever the solenoid is energized in a manner to be described hereinafter.

As shown in Fig. 19, the motor 433 is connected across the main conductors 383 and 384 forming one of the previously described circuits inter- connecting the game units 381, etc., by conductors 448 and 449, respectively. Thus, the motor 433 is energized to drive the dial 426 as long as the inter-connecting circuit comprising the main conductors 383 and 384 is closed prior to completion of a winning combination of scoring plays on one of the game units, and is de-energized to prevent further rotation of the dial 426 upon opening of the switch 393 in the manner previously described whenever a winning combination of scoring plays is made on one of the game units. The solenoid 446 is connected to the conductor 449 by conductors 452 and 453 and is connected to a contact 454 by a conductor 455. A switch 456 is movable between the contact 454 and a contact 457, and is connected to the conductor 448 by a conductor 458, the position of the switch 456 being controlled by a relay 459 which is connected to the conductor 453 and which is connected to a conductor 460 leading to the contact 457. The conductor 460 also leads to a switch 463 which is connected to the conductor 458 intermediate the switch 456 and the conductor 448 by a conductor 464, the switch 463 being actuable by a projection 465 on the disc 436 as will be described hereinafter.

Considering the operation of the score varying means 425, the dial 426 will occupy the position shown in Fig. 19 at the start of the contest so that the pointer 427 is opposite the numeral 12 on the dial, thus indicating the maximum possible score value that can be obtained for a given winning combination of scoring plays on any one of the game units 381, etc. With the dial 426 in this position, the projection 465 on the disc 436 holds the switch 463 closed so that the relay 459 is energized to hold the switch 456 in engagement with the contact 457, since the inter-connecting circuit comprising the main conductors 383 and 384 is closed at the start of the game as previously discussed. Since the relay 459 holds the switch 456 in engagement with the contact 457, the circuit to the solenoid 446 is open so that the solenoid is de-energized, the drive disc 435 being in frictional engagement with the disc 436 on the dial shaft 428 when the solenoid is de-energized, as previously discussed. Since the circuit inter-connecting the game units 381, etc., which includes the main conductors 383 and 384 is closed at the start of play as previously discussed, the motor 433, being connected across the main conductors 383 and 384, is energized at the start of the contest.

The motor 433 thus drives the dial 426 through the mechanism described in the direction of the arrow 432 so that the numerals 12, 11, 10, etc., move opposite the pointer 427 as the game progresses to denote progressively decreasing score values for the winning combinations of scoring plays. Upon completion of a winning combination of scoring plays on any of the game units 381, etc., the inter-connecting circuit comprising the main conductors 383 and 384 is opened in the manner previously described, thereby de-energizing the motor 433 to stop the dial 426 so that the pointer 427 indicates the score value obtaining at the instant that the winning combination of scoring plays is made. It will be noted that the projection 465 on the disc 436 will have disengaged the switch 463 during rotation of the dial 426 in the direction of the arrow 432 to permit the switch 463 to open, a suitable spring or the like (not shown) being provided to open the switch when it is disengaged by the projection 465 in this manner.

Since the relay 459 is also connected to the circuit comprising the main conductors 383 and 384, this relay will also be de-energized upon completion of a winning combination of scoring plays on any one of the game units 381, etc., at the same time that the motor 433 is de-energized so that the switch 456 controlled by the relay 459 may disengage the contact 457 and move into engagement with the contact 454, a suitable spring or the like (not shown) preferably being incorporated in the relay in the usual manner, for this purpose.

Thus, whenever a winning combination of scoring plays is made on any of the game units 381, etc., the motor 433 and the relay 459 will be de-energized, the switch 456 will be in engagement with the contact 454 and the switch 463 will be open. The solenoid 446 is still de-energized upon completion of a winning combination of scoring plays so that the drive disc 435 remains in frictional engagement with the disc 436 on the dial shaft 428, whereby the motor 433 holds the dial 426 in the position occupied thereby at the instant that the winning combination of scoring plays was completed.

After the score value for the winning combination of scoring plays indicated by the pointer 427 has been noted, it is necessary to re-set the dial 426 to its starting position as shown in Fig. 19 before beginning play of another game. It will be apparent that when the various game units 381, etc., have been transferred back to the inter-connecting circuit comprising the main conductors 383 and 384 in the manner previously described preparatory to beginning a new game, the relay 459 will remain de-energized since the switch 456 is in engagement with the contact 454 and the switch 463 is open. Consequently, the solenoid 446 is energized and rotates the motor 433 to disengage the drive disc 435 from the disc 436 on the dial shaft 428 to release the dial 426 so that it may be re-set to its starting position. As shown in Figs. 19 and 20, the dial 426 may be re-set to its starting position by a weight 468 suspended from a cord 469, or the like, which is wound around a pulley 470 carried by the dial shaft 428. Thus, upon disengagement of the drive disc 435 from the disc 436, the weight 468 causes the dial 426 to be rotated in a direction opposite to that indicated by the arrow 432 to restore the dial to its starting position, the disc 436 being provided with a projection 471 thereon which is adapted to engage a stop 472, as best shown in Fig. 19, to prevent rotation of the dial 426 beyond its starting position. Although I have shown a gravity-actuated system for re-setting the dial 426 upon disengagement of the drive disc 435 from the disc 436 on the dial shaft 428, it will be apparent that the dial may be re-set in any other suitable manner, as, for example, by means of a spring (not shown).

As the dial 426 is re-set to its starting position in the manner described, the projection 465 on the disc 436 closes the switch 463 to energize the relay 459, which then moves the switch 456 out of engagement with the contact 454 and into engagement with the contact 457, thus de-energizing the solenoid 446 to permit the drive disc 435 to re-engage the disc 436 on the dial shaft 428. Thus, rotation of the motor 433 is again communicated to the dail 426 and the dial continues to rotate until a winning combination of scoring plays is again made on one of the units 381, etc., whereupon the motor is again de-energized in the manner previously described.

It will thus be apparent that the score varying means 425 progressively reduces the value of a winning combination of scoring plays made on any one of the individual game units 381, etc., so that each player is competing against time in addition to competing with the remaining players. Consequently, the winning player must complete his winning combination of scoring plays in as short a time as possible in order to attain a high score. As previously mentioned, the score value of each winning combination may also depend on the relative ease or difficulty of making the combination, in addition to depending on the time required.

Referring to Fig. 21, I show a dial 475 which may be substituted for the dial 426 described previously, and in which the numerals indicating varying score values for winning combinations of scoring plays are scrambled so that the score value may either increase or decrease as the game progresses instead of being progressively reduced. Thus, a skillful player may withhold the scoring play required to complete a particular winning combination of scoring plays until a numeral denoting a high score value is opposite the pointer 427 so as to obtain a maximum score for that winning combination. Consequently, with the dial shown in Fig. 21, each player must not only attempt to be the first to complete a winning combination of scoring plays, but must also attempt to complete his winning combination at a time when the score value to be derived therefrom is at a high value. Re-setting of the dial shown in Fig. 21 is unnecessary since the numbers thereof are scrambled and the re-setting mechanism disclosed in connection with the dial 426 need not be employed.

Considering the embodiment of my invention illustrated in Fig. 22, I show an electrical system inter-connecting the game units 481, etc., whereby a winning combination of scoring plays made on any one unit does not immediately render the remaining units inoperative, this inter-connecting system being adapted to render any non-winning units inoperative only after a predetermined interval of time has elapsed from the start of the game. Thus, there may be several winners or no winners, and the object of the game is to make one of the winning combinations of scoring plays which carries a higher score value, some of the winning combinations of scoring plays being more difficult to make than others, as previously described, and therefore being assigned higher score values.

Referring to Fig. 22, various game units 481, etc., are inter-connected by an electrical system which includes three main conductors 483, 484, and 485. The game units 481, etc., are similar to the game units 381, etc., described previously so that identical identifying numerals have been employed for corresponding components thereof, various components of the game units 481, etc., being connected to the main conductor 483 in the same manner as the corresponding components of the game units 381, etc., are connected to the main conductor 383 of the electrical inter-connecting system illustrated in Fig. 19. The only difference between the game units 481, etc., and the game units 381, etc., described previously is that the relay 412 controls only the switch 404, the switch 413 being omitted from the embodiment shown in Fig. 22. The switch 404 is movable between the contacts 408 and 409 as previously described, these contacts being connected to the main conductors 484 and 485, respectively, by conductors 486 and 487, respectively.

The main conductors 483 and 484 are connected to the secondary winding of a transformer 492, the primary winding thereof being connected to a suitable source of current by conductors 493 and 494, one of which, 494, includes a main switch 495 which is closed when the game apparatus is in operation. The main conductor 485 is connected to the main conductor 484 between the transformer 492 and a switch 497 in the main conductor 484, the switch 497 being controlled by a relay 498 which is connected to the conductor 493 by a conductor 499, and which is connected to the conductor 494 by a conductor 500 through a switch 501. The switch 501 is controlled by a relay 502 as will be described in more detail hereinafter.

The embodiment of my invention illustrated in Fig. 22 includes a timing unit 505 which comprises a stationary dial 506 and a movable pointer 507, the dial having indicia thereon which are representative of suitable units of time. The pointer 507 is mounted on a shaft 508 having a disc 509 secured thereto, the disc 509 being frictionally engaged by a drive disc 510 which is mounted on the shaft 511 of an electric motor 512. The motor 512 is adapted to rotate the disc 510, which in turn drives the disc 509 in the direction of the arrow 513 so as to rotate the pointer 507 in the direction of the arrow. If desired, the motor 512 may be mounted on a movable base as described previously in connection with the motor 433 in the embodiment of Fig. 19 so that the speed of the pointer 507 may be varied to vary the time required for it to complete one revolution.

The motor 512 is connected to the main conductor 484 adjacent the transformer 492 by a conductor 516, and is connected to a conductor 517 by a conductor 518, the conductor 517 being connected to the relay 502, which in turn is connected to the conductor 516 so that the relay 502 and motor 512 are connected in parallel. The conductor 517 is connected to a switch 521 which is normally held closed by a spring (not shown) and which is adapted to be opened by a projection 522 on the disc 509 as will be described hereinafter, the switch 521 being connected to the main conductor 483 by a conductor 523. A switch 524 is connected across the conductors 517 and 523 by conductors 525 and 526, respectively, the switch 524 preferably being actuable by the re-setting mechanism 355 in a manner not specifically shown so that it is closed whenever the re-setting mechanism is operated to re-set the game units 481, etc., as will be discussed in more detail hereinafter.

Considering the operation of the embodiment of my invention shown in Fig. 22, it will be apparent that whenever scoring plays are made by causing the ball 34 to drop through the apertures 41, etc., in the playing surface 33, the corresponding auxiliary switches 141, etc., will be closed in the manner previously described to energize the corresponding indicators 71, etc., on the indicating panel 26. Whenever a winning combination of scoring plays in made on the game unit 481, for example, the master switch 160 of the winning unit will be closed in the manner previously described to close its winner circuit which includes the master indicator 96 and the relay 412. When energized in this manner, the relay 412 moves the switch 404 out of engagement with the contact 408 and into engagement with the contact 409, thus transferring the winning game unit from the circuit including the main conductors 483 and 484 to a circuit including the main conductors 483 and 485. Thus, each of the game units 481, etc., is connected to the circuit which includes the main conductors 483 and 484 until such time as a winning combination of scoring plays is made thereon, and is transferred to the circuit comprising the main conductors 483 and 485 upon completion of a winning combination of scoring plays. Transferring the game units upon which winning combinations of scoring plays have been made to the circuit which includes the main conductors 483 and 485 does not influence the operativeness of the game units with which winning combinations of scoring plays have not been made, such non-winning units being rendered inoperative by the timing unit 505 only after a predetermined interval of time has elapsed from the start of the contest as will be described in detail in the following paragraph.

Considering the operation of the timing unit 505, at the start of the contest the relays 498 and 502 will be energized so that the switches 497 and 501 controlled thereby will be closed, the switch 521 will be closed, the switch 524 will be open and the motor 512 will be energized to drive the pointer 507 in the direction of the arrow 513. At the end of a predetermined interval of time from the start of the contest, i. e., preferably after the pointer 507 has completed one complete revolution, the projection 522 on the disc 509 will engage and open the switch 521, thereby de-energizing the motor 512 to stop the pointer 507, and de-energizing the relay 502 so as to permit the switch 501 to open. Opening the switch 501 breaks the circuit to the relay 498 so that the switch 497 opens to break the interconnecting circuit which includes the main conductors 483 and 484. Since all of the game units on which winning combinations of scoring plays have not been made remain connected to this circuit, i. e., the inter-connecting circuit which includes the main conductors 483 and 484, such non-winning game units will be rendered inoperative upon completion of one full revolution of the pointer 507. However, any game units upon which winning combinations of scoring plays have been made will not be rendered inoperative since such game units have previously been transferred to the inter-connecting circuit which includes the main conductors 483 and 485 by the relays 412 associated therewith. Thus, all non-winning game units will be rendered inoperative at the end of a predetermined interval of time from the start of the game while any winning game units will remain operative, the scores derived by the various winning game units, if there be more than one winner, being determined by the relative score values assigned the various possible combinations of scoring plays since some of the winning combinations are more difficult to make than others as previously discussed. If desired, the duration of the game may be varied by varying the speed of the pointer 507 as previously discussed.

The various electrical and mechanical components of the game units 481, etc., are re-set in the manner previously described prior to beginning a new contest. In order to start the timing unit 505 at the beginning of the new contest, it is merely necessary to close the switch 524 momentarily. Closing the switch 524 completes the circuit to the relay 502 so that this relay becomes energized and closes the switch 501, thereby energizing the relay 498 to close the switch 497 so as to complete the inter-connecting circuit which includes the main conductors 483 and 484. Closing the switch 524 simultaneously energizes the motor 512 so that it begins to rotate the pointer 507 in the direction of the arrow 513, whereupon the projection 522 on the disc 509 disengages the switch 521 to permit this switch to close. The switch 521 now replaces the switch 524 and serves to keep the relay 502 energized. Consequently, the switch 524 need be closed only long enough to permit the projection 522 on the disc 509 to disengage the switch 521, and may thereafter be opened. As previously mentioned the switch 524 is preferably actuated by the mechanism 355 for re-setting the game units so that it remains closed only long enough to permit the projection 522 on the disc 509 to disengage the switch 521. Thus, the timing unit 505 is re-set automatically at the end of each game by the re-setting mechanism 355 which was described previously, the only operation required by the operator supervising the game being to depress the re-setting lever 358 at the start of each game.

It will be apparent that with the electrical system inter-connecting the various individual units 481, etc., shown in Fig. 22, a winning combination of scoring plays made on any one of these individual game units does not render the remaining units inoperative as is the case with the embodiment of my invention illustrated in Figs. 19 to 21. Thus, winning combinations may be made on more than one of the game units 481, etc., and the player making the first winning combination of scoring plays may continue to play in an effort to complete a more difficult winning combination. Consequently, the player making the most difficult combination of scoring plays will be adjudged the winner in the embodiment of my invention illustrated in Fig. 22.

It will be understood that the electrical inter-connecting systems for the various individual game units illustrated in Figs. 19 to 22 may be employed in connection with scoring systems other than the mechanical scoring apparatus 100 disclosed herein, since other apparatus for closing the auxiliary switches 141, etc., upon completion of individual scoring plays, and for closing the master switch 180 of each unit upon completion of a winning combination of scoring plays may be employed in connection with the electrical interconnecting systems disclosed. Consequently, I do not desire to be limited to the use of the mechanical scoring apparatus 100 in connection with the electrical inter-connecting systems illustrated in Figs. 19 to 22.

Although I have disclosed various exemplary embodiments of my invention, I do not intend to be limited to the specific constructions described herein since various changes, modifications and substitutions may be incorporated therein without departing from the spirit of the invention, and I hereby reserve the right to all such changes, modifications and substitutions as properly come within the scope of my invention as set forth in the appended claims.

I claim as my invention:

1. In a game apparatus adapted to be played by a plurality of players using such objects as balls, the combination of: a plurality of individual games each of which is adapted to be played by one of the players and each of which includes a plurality of groups of actuating devices which are movable from inoperative positions to operative positions by the objects; a plurality of groups of switches associated with each game and corresponding to the groups of actuating devices associated therewith, said actuating devices having means for closing the switches corresponding thereto when said actuating devices are moved to their operative positions; a plurality of groups of electrical indicators associated with each game and corresponding to the groups of actuating devices and groups of switches associated therewith, said indicators being electrically connected to the switches corresponding thereto; normally closed first circuit means normally electrically connected to the indicators of each game; normally open second circuit means adapted to be connected to the indicators of each game; a plurality of normally open master switches corresponding to said games; a plurality of control devices corresponding to said games, each control device having means for closing the master switch of the game with which it is associated; a plurality of releasable devices corresponding to the groups of actuating devices of each game, each group of actuating devices of each game having means for retaining the corresponding releasable device in an inoperative position as long as at least one of the actuating devices of the group is in its inoperative position, each releasable device having means operable upon release thereof for actuating the control device of the game with which it is associated to close the corresponding master switch; and electrical means in circuit with each of said master switches and adapted to be energized whenever the master switch in circuit therewith is closed for disconnecting the indicators of the game with which it is associated from said first circuit means and connecting such indicators to said second circuit means, and for simultaneously opening said first circuit means and closing said second circuit means.

2. In a game apparatus adapted to be played by a plurality of players using objects with which winning combinations of scoring plays may be made, the combination of: a plurality of individual games each adapted to be played by one of the players using at least one of the objects, and each including a normally open winner circuit and win-tracing means for closing said winner circuit when a winning combination of scoring plays has been made with the object; primary and secondary circuits interconnecting all of said individual games and adapted to supply power thereto; relay means in each of said winner circuits and energizable upon closure thereof for transferring the corresponding individual game from said primary circuit to said secondary circuit; a movable indicator common to all of said games; means connected to said primary circuit for driving said indicating member; and relay means in each of said winner circuits and energizable upon closure thereof for opening said primary circuit.

3. In a game apparatus adapted to be played by a plurality of players using objects with which winning combinations of scoring plays may be made, the combination of: a plurality of individual games each adapted to be played by one of the players using at least one of the objects, and each including a normally open winner circuit and win-tracing means for closing said winner circuit when a winning combination of scoring plays has been made with the object; primary and secondary circuits interconnecting all of said individual games and adapted to supply power thereto; relay means in each of said winner circuits and energizable upon closure thereof for transferring the corresponding individual game from said primary circuit to said secondary circuit; a movable indicator common to all of said games; means for driving said indicator: and switch means actuable by said indicator for de-energizing said driving means and for opening said primary circuit.

GEORGE A. HATHERELL.

References Cited in the file of this patent

UNITED STATES PATENTS

| Number | Name | Date |
|---|---|---|
| 718,176 | Treadway | Jan. 13, 1903 |
| 1,307,369 | Messiter | June 24, 1919 |
| 1,906,260 | Gibbs | May 2, 1933 |
| 1,950,187 | Mansel | Mar. 6, 1934 |
| 2,015,293 | Shyvers | Sept. 24, 1935 |
| 2,029,177 | MacDougall | Jan. 28, 1936 |
| 2,130,123 | Ebert | Sept. 13, 1938 |
| 2,197,520 | Ebert | Apr. 16, 1940 |
| 2,200,190 | Plouvier | May 7, 1940 |
| 2,237,746 | Perks | Apr. 8, 1941 |
| 2,291,749 | Nicholaus | Aug. 4, 1942 |
| 2,400,261 | Plebanek | May 14, 1946 |